United States Patent Office 3,352,943
Patented Nov. 14, 1967

3,352,943
AIR DRYING POLYESTERS
Pasquale J. Apice, Cresskill, N.J., assignor to Allied Chemical Corporation, New York, N.Y., a corporation of New York
No Drawing. Filed Nov. 15, 1965, Ser. No. 507,655
6 Claims. (Cl. 260—871)

This invention relates to novel air drying polyesters and a novel method of preparation thereof.

A solution of an ethylenically unsaturated polyester resin in polymerizable liquid ethylenically unsaturated material, such as styrene, is known in the art as a polyester-comonomer system.

Air drying polyesters are polyesters which permit polyester-comonomer systems to dry rapidly in air; whereas the drying of polyester-comonomer systems based on conventional ethylenically unsaturated polyesters is inhibited by oxygen, and is disadvantageously slow.

Because even thin films of polyester-comonomer systems based on air drying polyesters will dry within a few hours, they have aroused great interest in the coating field. Interest has also developed in the use of air drying polyesters in formulations for use as binders in fiber-reinforced shaped articles such as boat hulls and structural panels, and mixed with fillers for use as a putty or patching material.

As is well known in the art, polyesters are conventionally prepared by reacting dicarboxylic acids and dihydric alcohols in a molar ratio of about 1:1, under esterifying conditions. The air drying polyesters, heretofore known, were produced by incorporating into conventional polyester-forming reactants certain cyclic ethylenically unsaturated materials such as tetrahydrophthalic acid or the anhydride therefor, 4,4-bis(hydroxymethyl)cyclohexene and dicyclopentadiene. Although certain cyclic ethylenically unsaturated materials were found suitable for use in the preparation of air drying polyesters, it can not be said that all members of this class are inevitably so suitable. Canadian Patent 656,764 discloses at pages 1 to 2 that polyesters of 1,1-bis(hydroxymethyl)-(2,5-endomethyl)-2,5-endomethylene-cyclo - 3 - hexene and 1,1-bis(hydroxymethyl) - 6 - methyl - 2,5 - endomethylene-cyclo-3-hexene are non-air drying while polyesters of 4,4-bis(hydroxymethyl)cyclohexene have air drying properties. Hence, it is not possible to predict beforehand whether an individual cyclic ethylenically unsaturated material will be suitable for use in the preparation of air drying polyester resins and as is well known in the art, even if a material is found to advantageously contribute to certain properties in a polyester, e.g. the rate of drying in air, it is not possible to predict how it will influence other properties, e.g. hardness.

While the air drying polyesters heretofore known dry rapidly in the presence of oxygen, they have been found to dry to bodies which are poor in the properties of hardness and mar resistance. Attempts to improve such properties by altering the proportions of the polyester-forming reactants have been found to increase hardness and mar resistance but at the same time to increase drying time disadvantageously; so a balance is customarily struck in formulating such air drying polyesters which is not entirely satisfactory as some properties are improved at the expense of others. This problem is disclosed in the article "THPAA Coating System Developed" at page 61 of "Chemical and Engineering News" of Jan. 15, 1962.

Accordingly, it is an object of this invention to provide novel air drying polyester-comonomer systems which dry rapidly to bodies which are resistant to marring and attack by organic solvents and are aesthetically pleasing.

An additional object of this invention is to provide novel air drying polyesters which form bodies having better hardness and resistance to marring, humidity and solvents than obtainable using air drying polyesters heretofore known.

I have now discovered that these and other objects are achieved by the novel air drying polyesters of this invention having from about 4 to 70 weight percent, preferably from about 5 to 25 weight percent, based on the weight of the air drying polyester, of residues of 4-hydroxymethyl-4-($\alpha$ - hydroxy-$\Delta^3$-tetrahydrobenzyl)-cyclohexene or $\Delta^3$-tetrahydrobenzoic acid or mixtures thereof.

The air drying polyesters of this invention may be employed in such applications as surface coatings, binders for fibers in producing shaped articles such as boat hulls and structural panels, and mixed with filler for use as a putty or patching material.

The polyesters of this invention are particularly useful in surface coatings for articles such as furniture, as the rapid drying and rapid achievement of surface hardness permit a manufacturere to stack and handle such articles in a shorter time without fear of the articles sticking together or being marred.

4 - hydroxymethyl-4-($\alpha$-hydroxy-$\Delta^3$-tetrahydrobenzyl)-cyclohexene and $\Delta^3$-tetrahydrobenzoic acid can readily be obtained by treating three molecules of $\Delta^3$-tetrahydrobenzaldehyde, or low polymer thereof in an equivalent amount, with alkaline material to form one molecule of 4 - hydroxymethyl-4-($\alpha$-hydroxy-$\Delta^3$-tetrahydrobenzyl)cyclohexene and one molecule of $\Delta^3$-tetrahydrobenzoic acid as disclosed in British Patent 711,424, which process is highly efficient and can be carried out in simple apparatus at low cost.

The preparation of 4-hydroxymethyl-4-($\alpha$-hydroxy-$\Delta^3$-tetrahydrobenzyl)cyclohexene and $\Delta^3$-tetrahydrobenzoic acid from $\Delta^3$-tetrahydrobenzaldehyde may be conveniently represented by the equation:

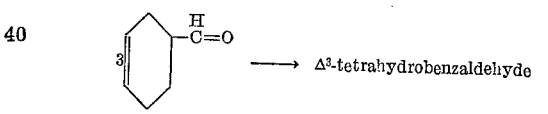

$\Delta^3$-tetrahydrobenzaldehyde

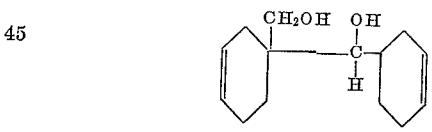

4-hydroxymethyl-4-($\alpha$-hydroxy-$\Delta^3$-tetrahydrobenzyl) cyclohexene and

$\Delta^3$-tetrahydrobenzoic acid $\Delta^3$-tetrahydrobenzaldehyde is readily obtainable by Diels-Alder condensation of acrolein and butadiene, which are available at low cost.

$\Delta^3$-tetrahydrobenzaldehyde is hereinafter referred to as THB aldehyde.

4 - hydroxymethyl-4-($\alpha$-hydroxy-$\Delta^3$-tetrahydrobenzyl)-cyclohexene is hereinafter referred to as THB diol.

$\Delta^3$-tetrahydrobenzoic acid is hereinafter referred to as THB acid.

Treatment of THB aldehyde or a low polymer thereof, can be carried out at temperatures of from about 0 to 150° C. preferably 70° to 150° C. under atmospheric or superatmospheric pressures. The minimum amount of alkaline material required is equal to one third of the molar equivalent of the aldehyde or low polymer thereof, however, an excess of alkali is preferred. Suitable alkaline materials are the carbonates, hydroxides, acid phosphates and alkoxides of the alkali metals, such as sodium and potassium. The treatment can be carried out in water or alcohol as a medium. A preferred alkaline medium is aqueous sodium hydroxide. Concentration of alkaline material can be from about 10 to 80%, preferably from about 15 to 50%. These products can be recovered from the reaction mixture separated and refined by conventional means. However, I have found that these products can also be recovered as a mixture and used as such directly in producing the air drying polyesters of this invention.

The air drying polyesters of this invention broadly comprise the esterification products of dicarboxylic acids and dihydric alcohols which are modified so as to contain as residues of from about 4% to 70% preferably from about 5% to 25%, based on the weight of the resultant air drying polyester, of TBA acid, or TBA diol or mixtures thereof.

The air drying polyesters of this invention can be prepared in accordance with conventional practices wherein the reactants are heated together until an air drying polyester having an acid number of less than about 70, preferably less than about 40 is formed. Alternatively, the air drying polyesters of this invention may be prepared by a novel process of this invention wherein THB aldehyde is converted to a mixture of THB acid and THB diol, which mixture is then reacted with the other reactants.

In preparing the air drying polyesters of this invention a molar ratio of dihydric alcohol to dicarboxylic acid reactants of from about 1 to 1.2:1 is suitable, a molar ratio of from about 1.02 to 1.1:1 being preferred.

The polycarboxylic acids suitable for producing the air drying polyesters of this invention are the ethylenically unsaturated dicarboxylic acids and anhydrides, where they exist, including maleic, fumaric, tetrahydrophthalic, chlorendic and the like, and the non-ethylenically unsaturated dicarboxylic acids, i.e. saturated and aromatically unsaturated dicarboxylic acids and their anhydrides, where they exist, including phthalic, isophthalic, terephthalic, adipic, hexahydrophthalic, tetrachlorophthalic, tetrabromophthalic and the like.

In preparing the air drying polyesters of this invention I have found a suitable molar ratio of ethylenically unsaturated dicarboxylic acid to non-ethylenically unsaturated dicarboxylic acid to be from about 1 to 5:1; a molar ratio of from about 1 to 3.5:1 being preferred.

In producing the air drying polyesters of this invention, suitable dihydric alcohols include ethylene, propylene, butylene and neopentyl glycols and dimers thereof, such as diethylene glycol, and the like.

As is understood in the art, mixtures of the polyester-forming reactants can be utilized in adjusted proportions to contribute to certain desirable properties, and likewise mono- or polycarboxylic acids can be used to replace minor portions of the dicarboxylic acids, and mono- or polyhydric alcohols can be used to replace minor portions of the dihydric alcohols to contribute to certain properties of the resulting air drying polyesters such as flexibility, chemical resistance, impact resistance, gloss, color, etc. as may be desirable for certain applications for the air drying polyesters.

I have found it advantageous when employing THB acid, to use as a reactant in producing the air drying polyesters of this invention up to about an equal amount of moles of an alcohol having at least 3 hydroxyl groups, such as glycerol.

It is advantageous to carry out the preparation of the air drying polyesters of this invention in an atmosphere in which air is replaced by an inert gas, e.g. nitrogen, carbon dioxide, and the like, by such means as are well known in the art, e.g. purging.

It is also advantageous to include in the reaction mixture an antioxidant, e.g. hydroquinone, 4-tertiary-butyl catechol, and the like.

Polymerizable comonomers which are suitable for mixing with the air drying polyesters of this invention to form the polyester-comonomer systems of this invention include styrene, vinyl toluene, divinyl benzene, diallyl phthalate and the like. Polyester-comonomer systems of this invention are compositions comprising 40 to 80%, preferably 50 to 75%, by weight of polyester, based on the total weight of the polyester and the comonomer.

Polyester-comonomer systems of this invention are dried by adding a suitable catalyst-promoter system immediately before use, as is conventional in the art. Such catalyst-promoter systems include the well-known peroxide catalyst used in the presence of conventional metallic salt promoters. Useful peroxide catalysts include, for example, methylethyl ketone peroxide, benzoyl peroxide, cumene hydroperoxide, 1-hydroxycyclohexyl hydroperoxide, di-tertiary-butyl hydroperoxide, and the like. Useful metallic salt promoters include, for example, the naphthenates, resinates, linoleates, and other soluble salts of metals selected from the class consisting of cobalt, manganese, copper, iron, chromium, calcium, nickel, lead, vanadium, and the like.

Pigments, opacifying agents, fire-retardants, flow control agents, stabilizer fillers, reinforcing agents and other such materials conventionally used in polymer compositions may be used in compositions containing the air drying polyester of this invention.

The following examples illustrate in detail the preparation of the air drying polyesters of this invention and compositions containing such polyesters and also, for purposes of comparison, certain air drying polyesters and compositions containing such polyesters which do not fall within the scope of the invention. It is not intended that the scope of this invention be limited to these specific examples.

All percentages given in the examples are percent by weight.

The catalyst-promoter system referred to in the examples consisted of 3% "Lupersol" DDM and 1.5% cobalt naphthenate, based on the total weight of the polyester-comonomer system. "Lupersol" DDM is a mixture of 60 weight percent methylethyl ketone peroxide and 40 weight percent dimethyl phthalate, supplied by Lucidol Division of Wallace & Tiernan Incorporated. The cobalt content of the cobalt naphthenate promotor was 6%.

In the examples, viscosities were determined by the Gardner bubble viscometer method, which is described in the Gardner Sward Paint Testing Manual, 12th Edition (1962), which is distributed by Gardner Laboratory Inc. Sward Rocker Hardness Test and Pencil Hardness Test mentioned hereinafter are also described therein. Dry time and tackiness were determined by touch. Gel time was determined by stirring a sample of the polyester-comonomer system, to which the catalyst-promoter system had been added, until gelling occurred. Solvent resistance was determined by allowing a 10 mil film to dry for five days, then acetone was dabbed on the film surface and rubbed by finger for one minute and then observed for any change in appearance or tackiness. The thumbnail was then drawn across the film surface, which was then observed for any visible marring.

Examples 1 and 2 given below illustrate the preparation of air drying polyesters of this invention by conventional processes and compositions containing such polyesters.

*Example 1*

To a vessel fitted with a thermometer, agitator, take off condenser and an inert gas inlet, were charged 8.9 grams of phthalic anhydride, 20.8 grams of fumaric acid, 6.7 grams of THB diol, 23.5 grams of diethylene glycol and 0.012 gram of hydroquinone. The vessel was purged with dry nitrogen gas and a blanket of dry nitrogen gas was maintained. The charge was heated to 190° to 200° C. with agitation and maintained until the acid number was 30 to 31.

The resulting polyester was allowed to cool to about 100° C. and then was dissolved in styrene to form a solution of a 40% styrene content which had a viscosity at 25° C. of G–H. Addition of the catalyst-promoter system to the solution caused gelling within 5 minutes. A 10 mil film of the catalyzed solution dried tack-free within 2½ hours and had a Sward Rocker hardness of 10. After 24 hours, at room temperature, the dried film had a Sward Rocker hardness of 26 to 30. The dried film was resistant to acetone after 5 days at room temperature.

*Example 2*

The procedure described in Example 1 was followed except that the charge was 8.9 grams of phthalic anhydride, 20.8 grams of fumaric acid, 7.6 grams of THB acid, 5.5 grams of glycerol, 20.5 grams of diethylene glycol and 0.012 gram of hydroquinone.

A 40% styrene content solution of the resulting polyester was produced and found to have a viscosity at 22° C. of R. The catalyst-promoter system was added to the solution causing gelling within 5 minutes. A 10 mil film of the catalyzed solution dried tack-free within 2½ hours and had a Sward Rocker hardness of 8. After 24 hours at room temperature the dried film had a Sward Rocker hardness of 28. The dried film was resistant to acetone after 5 days at room temperature.

Examples 3 and 4 given below illustrate the preparation of air drying polyesters of this invention by a method of this invention wherein a mixture of THB diol and THB acid is obtained from THB aldehyde and the mixture is then admixed with polyester-forming reactants and reacted.

*Example 3*

To a vessel fitted with a thermometer, agitator, and reflux condenser were charged 55 grams of THB aldehyde, to which 25 grams of 40% aqueous sodium hydroxide were then added dropwise over a period of about 2 minutes and the mixture heated with agitation at 105–110° C. for about 30 minutes. The reaction mixture was then mildly acidified with 37 grams of 25% aqueous hydrogen chloride solution and then extracted twice with 25 milliliter portions of toluene and separated. The toluene extracts were combined and washed twice with 25 ml. portions of cold water and separated. The toluene extract was found to have an acid number of 89 corresponding to a 20% solution of THB acid.

The procedure described in Example 1 was followed except that the charge was 8.9 grams of phthalic anhydride, 20.8 grams of fumaric acid, 24.5 grams of diethylene glycol, 16.7 grams of the toluene extract (containing 5.0 grams of THB diol and 3.3 grams of THB acid), 2.3 grams of glycerol and 0.012 gram of hydroquinone.

A 40% styrene content solution of the resulting polyester was produced and found to have a viscosity at 23° C. of E–F. The catalyst-promoter system was added to the solution causing gelling within 5 minutes. A 10 mil film of the catalyzed solution dried tack-free within 2½ hours and had a Sward Rocker hardness of 8. After 24 hours at room temperature the dried film had a Sward Rocker hardness of 20. The dried film was resistant to acetone after 5 days at room temperature.

*Example 4*

To a vessel as described in Example 3 were charged 10 grams of THB aldehyde to which 4.5 grams of 40% aqueous sodium hydroxide were then added dropwise and the mixture heated with agitation at about 90° C. for about 30 minutes which resulted in the formation of 5.5 grams of THB diol and 3.7 grams of THB acid.

To the vessel were then charged 8.9 grams of phthalic anhydride, 20.8 grams of fumaric acid, 24.5 grams of diethylene glycol, 2.3 grams of glycerol and 0.012 gram of hydroquinone. The condenser was changed from reflux to take off position, so that condensate (essentially water) would be removed from the reaction zone. The charge was then heated with agitation under an atmosphere of nitrogen gas until about 8.5 milliliters of water were removed as condensate, during which period the temperature of the vessel rose from about 90° to 200° C. The reaction mixture was then neutralized with hydrochloric acid. The temperature of the vessel was maintained at about 200° C. until the acid number was 34, during which period about 7 milliliters of water were removed as condensate.

The resultant resin was mixed with styrene to give a 37% styrene content solution which was then filtered to remove salt resulting from the neutralization. The filtered solution was clear pale yellow and had a viscosity at 21° C. of D–E. The catalyst-promoter system was added to the solution causing gelling within 5 minutes. A 10 mil film of the catalyzed solution dried tack-free within 3 hours and had a Sward Rocker hardness of 8. After 26 hours at room temperature the dried film had a Sward Rocker hardness of 22. After 5 days at room temperature, the dried film showed some marring when tested for solvent resistance and slight after-tack but recovered quickly.

*Example 5*

The procedure described in Example 1 was followed except that the charge was 220 grams of maleic anhydride, 114 grams of $\Delta^3$-tetrahydrophthalic acid anhydride, 334 grams of diethylene glycol and 0.3 milliliter of a solution of 10% hydroquinone in propylene glycol, and the charge heated to 210° C. and maintained until the acid number was about 26.

The resultant polyester was allowed to cool. At 170° C. 0.7 milliliter of the hydroquinone solution was added, and at 100° C. styrene was added to form a solution of 40% styrene content which had a viscosity at 25° C. of D–E.

The polyester described in this example was used for purpose of comparison.

*Example 6*

The procedure described in Example 1 was followed except that the charge was 294 grams of maleic anhydride, 334 grams of diethylene glycol and 9.3 milliliters of a solution of 10% hydroquinone in propylene glycol; the charge was heated to 180° C. and 50 grams of dicyclopentadiene was slowly added to the heated charge over a period of 25 minutes and heating at 200–210° C. was maintained until the acid number was 23.

The resultant polyester was allowed to cool. At 170° C., 0.7 milliliter of the hydroquinone solution was added and at 110° C. styrene was added to form a solution of 40% styrene content, which had a viscosity at 25° C. of F–G.

The polyester described in this example was used for purpose of comparison.

*Example 7*

The procedure described in Example 1 was followed except that the charge was 17.7 grams of phthalic anhydride, 13.9 grams of fumaric acid, 8.5 grams of 4,4-bis(hydroxymethyl)cyclohexene, 20.7 grams of diethylene glycol and 0.01 gram of hydroquinone and the charge heated at 200° C. until the acid number was less than 30.

A 40% styrene content solution was produced. The catalyst-promoter system was added to the solution causing gelling within 6 minutes. A 10 mil film of the catalyzed solution dried tack-free in 3 to 4 hours at room temperature. After 6 days at room temperature the dried film had a Sward Rocker hardness of 24 and a pencil hardness of H.

The polyester described in this example was used for purpose of comparison.

Data obtained in testing films based on the air drying polyesters of this invention (described in Examples 1, 2, 3 and 4) and standard air drying polyesters (described in Examples 5, 6 and 7) are presented in the tables given below.

The samples tested were obtained by preparing a 40% styrene solution of the polyesters of each of the examples, the catalyst-promoter system, and 0.04% of "SF–1023" were added to each solution. "SF–1023" is a 100% silicone fluid flow control agent, supplied by the Silicone Products Department of General Electric Company. A 10 mil film of each of the catalyzed solutions was prepared on a glass plate and allowed to dry at room temperature and tested at various periods of time. The sample numbers used correspond to the example numbers of the various polyester resins.

Table I shows the rate of air drying of films based on the polyesters of Examples 1 through 7, as measured by the Sward Rocker Hardness Test.

Table II shows the loss of hardness of films of polyesters of Examples 1, 2, 3, 5 and 6 on exposure to high humidity, i.e. 95%, and subsequent recovery of hardness on standing for 7 days at room temperature at a lower humidity, i.e. 50–60%.

Table III illustrates the pencil hardness and solvent resistance of the films based on polyesters of Examples 1, 2, 3, 5, 6, and 7.

I claim:
1. An air drying polyester comprising polymeric condensation reaction products of ethylenically unsaturated dicarboxylic acids and dihydric alcohols and having from about 4 to 70 weight percent residue of 4-hydroxymethyl-4-($\alpha$-hydroxy-$\Delta^3$-tetrahydrobenzyl)cyclohexene therein.
2. An air drying polyester as specified in claim 1 wherein said residue is from about 5 to 25 weight percent.
3. An air drying polyester as specified in claim 2 wherein said residue is admixed with a residue of $\Delta^3$-tetrahydrobenzoic acid.
4. An air drying polyester as specified in claim 2 which is the product of reaction under esterifying conditions of polyester forming-reactants comprising fumaric acid and phthalic anhydride in a molar ratio of from about 1 to 3.5:1.
5. A composition suitable for use as an air drying surface coating comprising:
    (A) from about 50 to 75 parts by weight of an air drying polyester as specified in claim 4, and
    (B) from about 50 to 25 parts by weight of a liquid polymerizable ethylenically unsaturated comonomer.
6. A composition as specified in claim 5 wherein (B) is styrene.

TABLE I.—RATE OF AIR DRYING AND SWARD ROCKER HARDNESS

| Hours | Sample Number | | | | | | |
|---|---|---|---|---|---|---|---|
| | 1 | 2 | 3 | 4 | 5 | 6 | 7 |
| 1 | T | ST | T | VT | T | T | T |
| 2 | VST, 8 | VST, 6 | VST, 4 | VST | VST, 2 | VST, 2 | ST |
| 2.5 | D, 10 | D, 8 | D, 8 | VST 8 | VST, 4 | VST, 2 | |
| 3 | 12 | 12 | 10 | | D, 4 | VST, 2 | VST |
| 4 | 14 | 14 | 12 | | 6 | D, 2 | D |
| 5 | 16 | 16 | 14 | 12 | 8 | 4 | |
| 6 | 18 | 17 | 16 | | 10 | 4 | |
| 7 | | | | 14 | | | |
| 24 | 26 | 28 | 20 | 22 | 14 | 12 | |
| 48 | 27 | 26 | 20 | 32 | 14 | 14 | |

NOTE.—W=wet, VT=very tacky, T=tacky, ST=slightly tacky, VST=very slightly tacky, D=dry. Figures represent Sward Rocker Hardness values.

TABLE II.—EFFECT OF HIGH HUMIDITY ON SWARD ROCKER HARDNESS

| | Sample Number | | | | |
|---|---|---|---|---|---|
| | 1 | 2 | 3 | 5 | 6 |
| Initial [1] | 44 | 49 | 41 | 28 | 31 |
| 4 days (95% RH) [2] | 18 | 21 | 14 | 12 | 12 |
| 7 days at R.T. [3] | 29 | 32 | 26 | 16 | 21 |

[1] Sward Rocker Hardness of 10 mil films after a few weeks at room temperature.
[2] All panels were placed in closed chamber over water at room temperature for expsoure to high humidity for 4 days.
[3] The panels were removed from high humidity chamber and allowed to stand at room temperature 7 days (measured at 75° F. 50–60% relative humidity).

TABLE III.—PENCIL HARDNESS AND SOLVENT RESISTANCE TEST

| | Sample Number | | | | | |
|---|---|---|---|---|---|---|
| | 1 | 2 | 3 | 5 | 6 | 7 |
| Pencil Hardness [1] | 3H | 2H | H | H | 2H | H |
| Solvent Resistance [2] | P | P | M | P | P | P |

[1] Pencil hardness scale: HB, H, 2H, 3H, in order of increasing hardness.
[2] 1 min. acetone rub followed by drawing thumbnail across the film to observe marring. P=passes, M=mars with thumbnail.
All films (10 mils) were air-dried at room temperature for 5 days before testing.

References Cited

UNITED STATES PATENTS 3,044,978  7/1962  Hagele et al. _____ 260—871
3,210,440  10/1965  Batzer et al. _____ 260—861

SAMUEL H. BLECH, *Primary Examiner.*

MURRAY TILLMAN, *Examiner.*

J. T. GOOLKASIAN, *Assistant Examiner.*